(12) United States Patent
Zhou

(10) Patent No.: US 10,848,472 B2
(45) Date of Patent: *Nov. 24, 2020

(54) METHOD AND WLAN CONTROLLER FOR MANAGING AUTHENTICATION DATA OF STA

(71) Applicant: Huawei Technologies Co., Ltd., Shenzhen (CN)

(72) Inventor: Dongming Zhou, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/718,713

(22) Filed: Dec. 18, 2019

(65) Prior Publication Data

US 2020/0127989 A1    Apr. 23, 2020

Related U.S. Application Data

(63) Continuation of application No. 15/248,609, filed on Aug. 26, 2016, now Pat. No. 10,536,442.

(30) Foreign Application Priority Data

Aug. 27, 2015    (CN) .......................... 2015 1 0537021

(51) Int. Cl.
*G06F 7/04* (2006.01)
*H04L 29/06* (2006.01)
(Continued)

(52) U.S. Cl.
CPC ............ *H04L 63/062* (2013.01); *H04L 63/08* (2013.01); *H04W 12/0403* (2019.01);
(Continued)

(58) Field of Classification Search
CPC .... H04L 63/08; H04L 63/062; H04W 76/021; H04W 84/12; H04W 12/04; H04W 36/0038; H04W 88/08; H04W 8/12
See application file for complete search history.

(56) References Cited

U.S. PATENT DOCUMENTS

2004/0105416 A1* 6/2004 Rue .................. H04W 12/0802
370/338
2004/0165551 A1* 8/2004 Krishnamurthi ...... H04L 45/741
370/328
(Continued)

FOREIGN PATENT DOCUMENTS

CN    102487504 A    6/2012
CN    103747431 A    4/2014
(Continued)

OTHER PUBLICATIONS

Machine Translation and Abstract of Japanese Publication No. JP2000261849, Sep. 22, 2000, 27 pages.
(Continued)

*Primary Examiner* — Gary S Gracia
(74) *Attorney, Agent, or Firm* — Conley Rose, P.C.

(57) ABSTRACT

A method includes determining, by a first wireless local area network (WLAN) controller, that a first access point (AP) is an edge AP when a first STA associates with the first AP, where the edge AP is an AP neighboring to another AP, and the other AP and the edge AP are respectively managed by different WLAN controllers, and sending, by the first WLAN controller, authentication data of the first STA to at least one WLAN controller.

20 Claims, 4 Drawing Sheets

(51) Int. Cl.
*H04W 76/11* (2018.01)
*H04W 36/00* (2009.01)
*H04W 12/04* (2009.01)
*G06F 15/16* (2006.01)
*H04W 84/12* (2009.01)
*H04W 88/08* (2009.01)

(52) U.S. Cl.
CPC ........ *H04W 36/0038* (2013.01); *H04W 76/11* (2018.02); *H04W 84/12* (2013.01); *H04W 88/08* (2013.01)

(56) References Cited

U.S. PATENT DOCUMENTS

| | | | |
|---|---|---|---|
| 2006/0187878 A1* | 8/2006 | Calhoun | H04W 36/0033 370/331 |
| 2006/0294246 A1* | 12/2006 | Stieglitz | H04W 8/00 709/228 |
| 2007/0064673 A1* | 3/2007 | Bhandaru | H04L 63/08 370/351 |
| 2008/0146230 A1* | 6/2008 | Pandian | H04W 40/36 455/436 |
| 2009/0086689 A1* | 4/2009 | Hunt | H04W 28/06 370/338 |
| 2009/0172391 A1 | 7/2009 | Kasapidis | |
| 2009/0286534 A1* | 11/2009 | Garg | H04W 12/0602 455/432.1 |
| 2011/0103284 A1* | 5/2011 | Gundavelli | H04W 40/248 370/312 |
| 2012/0060205 A1* | 3/2012 | Tie | H04W 12/04 726/3 |
| 2012/0099481 A1* | 4/2012 | Dong | H04W 16/18 370/255 |
| 2012/0144462 A1* | 6/2012 | Pochop, Jr. | H04L 63/062 726/6 |
| 2012/0257603 A1* | 10/2012 | Mercier | H04W 24/02 370/338 |
| 2013/0028163 A1* | 1/2013 | Hsiao | H04W 4/06 370/312 |
| 2013/0265941 A1* | 10/2013 | Chang | H04W 12/06 370/328 |
| 2014/0086132 A1* | 3/2014 | Liu | H04L 12/185 370/312 |
| 2015/0312820 A1* | 10/2015 | Yang | H04W 84/12 370/331 |
| 2015/0365911 A1* | 12/2015 | Mohandas | H04W 56/001 370/338 |
| 2017/0163597 A1* | 6/2017 | Amerneni | H04L 61/2061 |

FOREIGN PATENT DOCUMENTS

| | | |
|---|---|---|
| EP | 2461624 A1 | 6/2012 |
| JP | 2000261849 A | 9/2000 |
| WO | 2006003859 A1 | 1/2006 |

OTHER PUBLICATIONS

Machine Translation and Abstract of Chinese Publication No. CN102487504, Jun. 6, 2012, 16 pages.
Machine Translation and Abstract of Chinese Publication No. CN103747431, Apr. 23, 2014, 13 pages.
"Part 11: Wireless LAN Medium Access Control (MAC) and Physical Layer (PHY) Specifications," IEEE Computer Society, IEEE Std 802.11, Part 1, Mar. 29, 2012, 1396 pages.
"Part 11: Wireless LAN Medium Access Control (MAC) and Physical Layer (PHY) Specifications," IEEE Computer Society, IEEE Std 802.11, Part 2, Mar. 29, 2012, 1397 pages.
Calhoun, P., Ed., et al., "Control and Provisioning of Wireless Access Points (CAPWAP) Protocol Specification," RFC 5415, Mar. 2009, 155 pages.
Narten, T., et al., "Neighbor Discovery for IP version 6 (IPv6)," RFC 4861, Sep. 2007, 97 pages.
Foreign Communication from a Counterpart Application, European Application No. 16185834.5, Extended European Search Report dated Jan. 11, 2017, 8 pages.
Foreign Communication From a Counterpart Application, Japanese Application No. 2016-165311, Japanese Office Action dated Jan. 9, 2018, 3 pages.
Foreign Communication From a Counterpart Application, Japanese Application No. 2016-165311, English Translation of Japanese Office Action dated Jan. 9, 2018, 3 pages.
Foreign Communication From a Counterpart Application, Chinese Application No. 201510537021.1, Chinese Office Action dated Mar. 28, 2019, 6 pages.

* cited by examiner

METHOD AND WLAN CONTROLLER FOR MANAGING AUTHENTICATION DATA OF STA

CROSS-REFERENCE TO RELATED APPLICATION

This application is a continuation of U.S. patent application Ser. No. 15/248,609 filed on Aug. 26, 2016, which claims priority to Chinese Patent Application No. 201510537021.1 filed on Aug. 27, 2015. All of the aforementioned patent applications are hereby incorporated by reference in their entireties.

TECHNICAL HELD

This application relates to the field of communications technologies, and in particular, to a method, an apparatus, and a device for managing authentication data of a station (STA).

BACKGROUND

A STA accesses, by associating with an access point (AP), a wireless local area network (WLAN) controller that manages the AP.

The STA may be handed over between different WLAN controllers by associating with APs managed by the different WLAN controllers, and this manner is referred to as roaming of the STA between WLAN controllers. Multiple WLAN controllers may communicate with each other, and the multiple WLAN controllers may form, in a network, a single system with a particular function, where the system may be referred to as a WLAN controller cluster. As shown in FIG. 1, a service device may be independently disposed in a WLAN controller cluster, to manage WLAN controllers in the WLAN controller cluster, where the independently disposed service device is referred to as a cluster server. Alternatively, there may be no cluster server disposed in the WLAN controller cluster.

When a STA is handed over in a WLAN controller cluster, authentication data of the STA needs to be synchronized between WLAN controllers before and after the handover. A scenario in which a cluster server is disposed, the authentication data of the STA needs to be synchronized to the cluster server in advance such that when the STA associates with an AP managed by a different WLAN controller, the STA does not need to be authenticated repeatedly. The authentication data of the STA includes a media access control (MAC) address of the STA, a pairwise master key (PMK) between the STA and an AP associated with the STA, an identifier of a WLAN controller that manages the AP associated with the STA, and the like.

Generally, a WLAN controller that manages an AP currently associated with an STA sends authentication data of the STA to other WLAN controllers in a WLAN controller cluster when the STA associates with the AP, or in a scenario in which a cluster server is disposed, the authentication data of the STA needs to be synchronized to the cluster server. As a quantity of STAs increases, an amount of signaling required by processing when a WLAN controller synchronizes authentication data of the STAs also increases correspondingly, which greatly affects performance of an entire system.

SUMMARY

This application provides a method, an apparatus, and a device for managing authentication data of a STA, to resolve a problem that system performance is affected because relatively much signaling is required by processing when a WLAN controller synchronizes authentication data of a STA when the STA associates with an AP.

According to a first aspect, a method for managing authentication data of a STA is provided, including determining, by a first WLAN controller, that a first AP is an edge AP when a first STA associates with the first AP, where the edge AP is an AP neighboring to another AP, and the other AP and the edge AP are respectively managed by different WLAN controllers, and sending, by the first WLAN controller, authentication data of the first STA to at least one WLAN controller.

With reference to the first aspect, in a first possible implementation manner of the first aspect, the at least one WLAN controller includes a second WLAN controller, the second WLAN controller is a WLAN controller that manages a second AP, and the second AP is an AP neighboring to the first AP.

With reference to the first aspect or the first possible implementation manner of the first aspect, in a second possible implementation manner of the first aspect, sending, by the first WLAN controller, authentication data of the first STA to at least one WLAN controller includes sending, by the first WLAN controller, the authentication data of the first STA to the at least one WLAN controller, and modifying an authentication data synchronization identifier of the first STA to synchronized when the authentication data synchronization identifier of the first STA is unsynchronized, and sending, by the first WLAN controller, the modified authentication data synchronization identifier of the first STA to the at least one WLAN controller.

With reference to the second possible implementation manner of the first aspect, in a third possible implementation manner of the first aspect, the authentication data synchronization identifier of the first STA includes multiple authentication data synchronization flags, and the multiple authentication data synchronization flags are mapped to multiple WLAN controllers. The authentication data synchronization identifier of the first STA is unsynchronized includes an authentication data synchronization flag corresponding to the at least one WLAN controller is unsynchronized, and modifying the authentication data synchronization identifier of the first STA to synchronized includes modifying the authentication data synchronization flag corresponding to the at least one WLAN controller to synchronized.

With reference to the third possible implementation manner of the first aspect, in a fourth possible implementation manner of the first aspect, the method further includes determining, by the first WLAN controller, a WLAN controller from which authentication data is to be deleted when a second STA associates with the first AP, where an authentication data synchronization flag that is of the second STA and that corresponds to the WLAN controller from which authentication data is to be deleted is synchronized, and no AP in at least one AP managed by the WLAN controller from which authentication data is to be deleted is neighboring to the first AP, sending, by the first WLAN controller, an authentication data deletion message to the WLAN controller from which authentication data is to be deleted, where the authentication data deletion message includes an identifier of the second STA, and the authentication data deletion message instructs a receiver of the authentication data deletion message to delete authentication data of the second STA, and modifying, by the first WLAN controller, the authentication data synchronization flag that is of the second STA, that corresponds to the WLAN controller from which authentication data is to be deleted, and that is in an authentication data synchronization identifier of the second STA to unsynchronized, and sending the authentication data synchronization identifier of the second STA.

With reference to any one of the first aspect and the first to fourth possible implementation manners of the first aspect, in a fifth possible implementation manner of the first aspect, the method further includes determining, by the first WLAN controller, that the first WLAN controller has stored authentication data of a third STA when the third STA associates with a third AP, where the third AP is an internal AP, and the internal AP is an AP whose neighbor APs are all managed by a same WLAN controller, and sending, by the first WLAN controller, an authentication data deletion message, where the authentication data deletion message includes an identifier of the third STA, and the authentication data deletion message instructs a receiver of the authentication data deletion message to delete the authentication data of the third STA.

With reference to the third or fourth possible implementation manner of the first aspect, in a sixth possible implementation manner of the first aspect, sending, by the first WLAN controller, an authentication data deletion message to a WLAN controller corresponding to an authentication data synchronization flag that is synchronized, in multiple authentication data synchronization flags of a fourth STA when the fourth STA associates with a fourth AP, where the authentication data deletion message includes an identifier of the fourth STA, the authentication data deletion message instructs a receiver of the authentication data deletion message to delete authentication data of the fourth STA, the fourth AP is an internal AP, and the internal AP is an AP whose neighboring APs are all managed by a same WLAN controller.

According to a second aspect, an apparatus for managing authentication data of a STA is provided, where the management apparatus is implemented by a first WLAN controller, and the apparatus includes a first determining module configured to determine that a first AP is an edge AP when a first STA associates with the first AP, where the edge AP is an AP neighboring to another AP, and the other AP and the edge AP are respectively managed by different WLAN controllers, and a first sending module configured to send authentication data of the first STA to at least one WLAN controller.

With reference to the second aspect, in a first possible implementation manner of the second aspect, the at least one WLAN controller includes a second WLAN controller, the second WLAN controller is a WLAN controller that manages a second AP, and the second AP is an AP neighboring to the first AP.

With reference to the second aspect or the first possible implementation manner of the second aspect, in a second possible implementation manner of the second aspect, the first sending module is further configured to send the authentication data of the first STA to the at least one WLAN controller, modify an authentication data synchronization identifier of the first STA to synchronized when the authentication data synchronization identifier of the first STA is unsynchronized, and send the modified authentication data synchronization identifier of the first STA to the at least one WLAN controller.

With reference to the second possible implementation manner of the second aspect, in a third possible implementation manner of the second aspect, the authentication data synchronization identifier of the first STA includes multiple authentication data synchronization flags, and the multiple authentication data synchronization flags are mapped to multiple WLAN controllers, and the first sending module is further configured to send the authentication data of the first STA to the at least one WLAN controller, modify an authentication data synchronization flag corresponding to the at least one WLAN controller to synchronized when the authentication data synchronization flag corresponding to the at least one WLAN controller is unsynchronized, and send the modified authentication data synchronization identifier of the first STA to the at least one WLAN controller.

With reference to the third possible implementation manner of the second aspect, in a fourth possible implementation manner of the second aspect, the apparatus further includes an execution module and a second sending module, where the second sending module is configured to, when a second STA associates with the first AP, determine a WLAN controller from which authentication data is to be deleted, and send an authentication data deletion message to the WLAN controller from which authentication data is to be deleted, where the authentication data deletion message includes an identifier of the second STA, the authentication data deletion message instructs a receiver of the authentication data deletion message to delete authentication data of the second STA, an authentication data synchronization flag that is of the second STA and that corresponds to the WLAN controller from which authentication data is to be deleted is synchronized, and no AP in at least one AP managed by the WLAN controller from which authentication data is to be deleted is neighboring to the first AP, and the execution module is configured to modify the authentication data synchronization flag that is of the second STA, that corresponds to the WLAN controller from which authentication data is to be deleted, and that is in an authentication data synchronization identifier of the second STA to unsynchronized, and send the authentication data synchronization identifier of the second STA.

With reference to any one of the second aspect and the first to fourth possible implementation manners of the second aspect, in a fifth possible implementation manner of the second aspect, the apparatus further includes a second determining module and a third sending module, where the second determining module is configured to determine that the first WLAN controller has stored authentication data of a third STA when the third STA associates with a third AP, where the third AP is an internal AP, and the internal AP is an AP whose neighbor APs are all managed by a same WLAN controller, and the third sending module is configured to send an authentication data deletion message, where the authentication data deletion message includes an identifier of the third STA, and the authentication data deletion message instructs a receiver of the authentication data deletion message to delete the authentication data of the third STA.

With reference to the second aspect or the third or fourth possible implementation manner of the second aspect, in a sixth possible implementation manner of the second aspect, the apparatus further includes a fourth sending module, where the fourth sending module is configured to send an authentication data deletion message to a WLAN controller corresponding to an authentication data synchronization flag that is synchronized, in multiple authentication data synchronization flags of a fourth STA when the fourth STA associates with a fourth AP, where the authentication data deletion message includes an identifier of the fourth STA, the authentication data deletion message instructs a receiver of the authentication data deletion message to delete authentication data of the fourth STA, the fourth AP is an internal AP, and the internal AP is an AP whose neighboring APs are all managed by a same WLAN controller.

According to a third aspect, a WLAN controller is provided, including a processor, a memory, and an interface, where the processor is configured to determine that the first AP is an edge AP when a first STA associates with the first AP, and send authentication data of the first STA to at least one WLAN controller through the interface, where the edge AP is an AP neighboring to another AP, and the other AP and the edge AP are respectively managed by different WLAN controllers, and the memory is configured to store the authentication data of the first STA.

With reference to the third aspect, in a first possible implementation manner of the third aspect, the processor sends the authentication data of the STA to the at least one WLAN controller through the interface, where the at least one WLAN controller includes a second WLAN controller, the second WLAN controller is a WLAN controller that manages a second AP, and the second AP is an AP neighboring to the first AP.

With reference to the third aspect or the first possible implementation manner of the third aspect, in a second possible implementation manner of the third aspect, the processor is further configured to send the authentication data of the first STA to the at least one WLAN controller through the interface, and modify an authentication data synchronization identifier of the first STA to synchronized when the authentication data synchronization identifier of the first STA is unsynchronized, and send the modified authentication data synchronization identifier of the first STA to the at least one WLAN controller through the interface.

With reference to the second possible implementation manner of the third aspect, in a third possible implementation manner of the third aspect, the authentication data synchronization identifier of the first STA includes multiple authentication data synchronization flags, and the multiple authentication data synchronization flags are mapped to multiple WLAN controllers, and the processor is further configured to modify an authentication data synchronization flag corresponding to the at least one WLAN controller to synchronized when the authentication data synchronization flag corresponding to the at least one WLAN controller is unsynchronized.

With reference to the third possible implementation manner of the third aspect, in a fourth possible implementation manner of the third aspect, the processor is further configured to determine a WLAN controller from which authentication data is to be deleted when a second STA associates with the first AP, where an authentication data synchronization flag that is of the second STA and that corresponds to the WLAN controller from which authentication data is to be deleted is synchronized, and no AP in at least one AP managed by the WLAN controller from which authentication data is to be deleted is neighboring to the first AP, send, through the interface, an authentication data deletion message to the WLAN controller from which authentication data is to be deleted, where the authentication data deletion message includes an identifier of the second. STA, the authentication data deletion message instructs a receiver of the authentication data deletion message to delete authentication data of the second STA, and modify the authentication data synchronization flag that is of the second STA, that corresponds to the WLAN controller from which authentication data is to be deleted, and that is in an authentication data synchronization identifier of the second STA to unsynchronized, and send the authentication data synchronization identifier of the second STA.

With reference to any one of the third aspect and the first to fourth possible implementation manners of the third aspect, in a fifth possible implementation manner of the third aspect, the processor is further configured to determine that the first WLAN controller has stored authentication data of a third STA when the third. STA associates with a third AP, where the third AP is an internal AP, and the internal AP is an AP whose neighbor APs are all managed by a same WLAN controller, and send an authentication data deletion message through the interface, where the authentication data deletion message includes an identifier of the third STA, and the authentication data deletion message instructs a receiver of the authentication data deletion message to delete the authentication data of the third STA.

With reference to the third aspect or the third or fourth possible implementation manner of the third aspect, in a sixth possible implementation manner of the third aspect, the processor is further configured to send, through the interface, an authentication data deletion message to a WLAN controller corresponding to an authentication data synchronization flag that is synchronized, in multiple authentication data synchronization flags of a fourth STA when the fourth STA associates with a fourth AP, where the authentication data deletion message includes an identifier of the fourth STA, the authentication data deletion message instructs a receiver of the authentication data deletion message to delete authentication data of the fourth STA, the fourth AP is an internal AP, and the internal AP is an AP whose neighboring APs are all managed by a same WLAN controller.

According to the foregoing technical solutions, a first WLAN controller determines that a first AP is an edge AP, and the first WLAN controller sends authentication data of a first STA to at least one WLAN controller when the first STA associates with the first AP. The first WLAN controller sends the authentication data of the first STA to at least one WLAN controller when the first STA associates with the first AP, and only when the first P is an edge AP. In this way, even though a quantity of STAs in a system increases, a WLAN controller synchronizes authentication data of a STA only when the STA associates with an edge AP such that signaling that needs to be processed when the authentication data of the STA is synchronized is reduced, thereby improving performance of the entire system.

DESCRIPTION OF EMBODIMENTS

For a problem that in a general case, system performance is affected because relatively much signaling is required by processing when a WLAN controller synchronizes authentication data of a STA when the STA associates with an AP, the present disclosure provides technical solutions in which authentication data of the STA is sent to at least one WLAN controller only when a STA associates with an edge AP. In this way, even though a quantity of STAs in a system increases, a WLAN controller synchronizes authentication data of a STA only when the STA associates with an edge AP such that signaling that needs to be processed when the authentication data of the STA is synchronized is reduced, thereby improving performance of the entire system.

A main implementation principle and a specific implementation manner of the technical solutions of embodiments of the present disclosure, and a beneficial effect that can be achieved correspondingly by the technical solutions are described below in detail with reference to accompanying drawings.

Embodiment 1

Embodiment 1 of the present disclosure provides a system for managing authentication data of a STA, including at least two WLAN controllers. Each WLAN controller in the system for managing authentication data of a STA manages at least one AP. The STA associates with the AP.

In the system for managing authentication data of an STA, as the STA moves, the STA may execute association and disassociation between different APs, to complete roaming. APs associated with the STA before roaming of the STA and after roaming of the STA may be APs managed by a same WLAN controller, or may be APs managed by different WLAN controllers.

Figure 1:
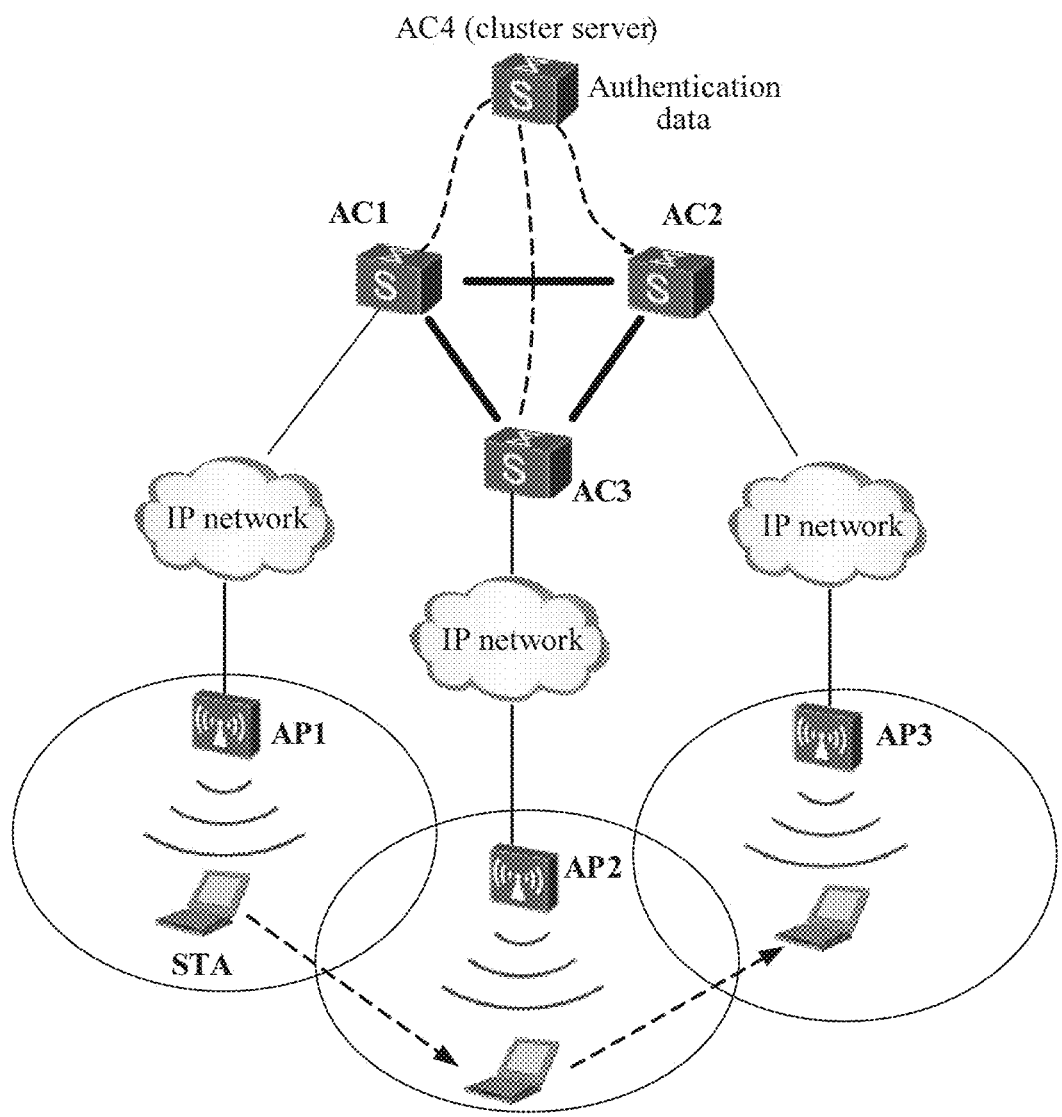
FIG. 1 is a schematic structural composition diagram of a WLAN controller cluster system in which a cluster controller is disposed.
Figure 2:
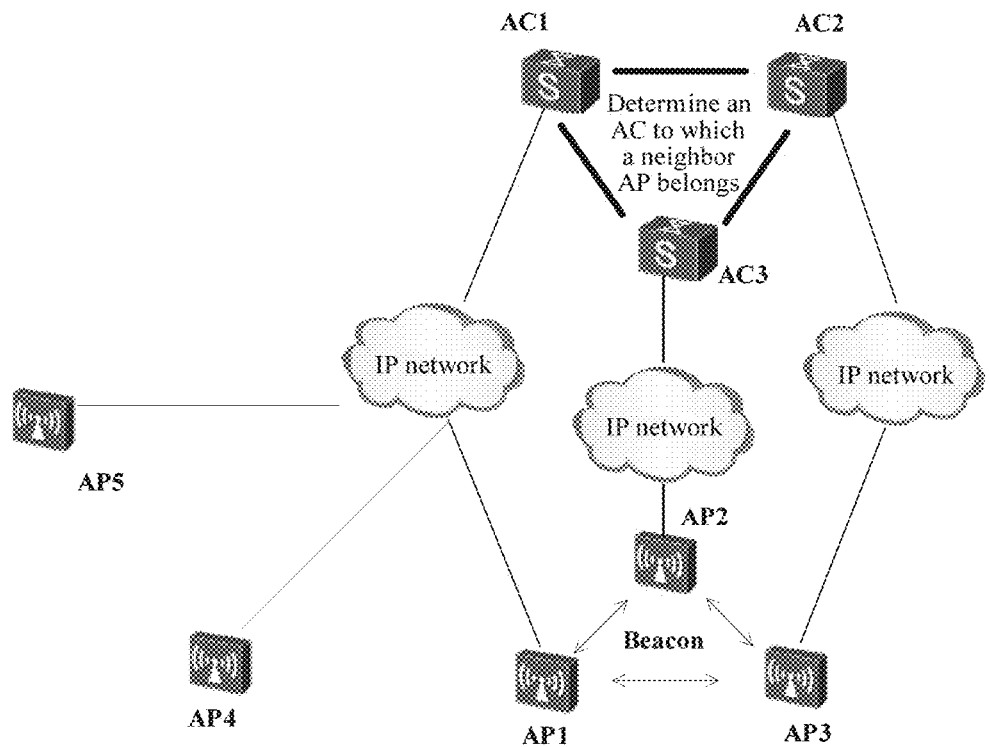
FIG. 2 is a schematic structural composition diagram of a system including an edge AP and a neighbor WLAN controller according to Embodiment 1 of the present disclosure.

In a technical solution provided in Embodiment 1 of the present disclosure, APs are classified into an internal AP and an edge AP. The edge AP is an AP neighboring to another AP, and the other AP and the edge AP are respectively managed by different WLAN controllers. That is, the edge AP is a type of AP with the following features. In all neighboring APs of the edge AP, at least one AP is managed by a WLAN controller that is different from a WLAN controller that manages the edge AP. The internal AP is an AP whose neighboring APs are all managed by a same WLAN controller. That is, the internal AP is a type of AP with the following features. The internal AP and all neighboring APs of the internal AP are managed by a same WLAN controller. A pair of neighbor APs refers to two APs that may become APs associated with a STA before and after roaming of the STA, and either AP of the pair of neighbor APs is a neighboring AP of the other AP. For ease of description, WLAN controllers that respectively manage two neighboring edge APs are referred to as neighbor WLAN controllers. A system architecture shown in FIG. 2 is used as an example, and the system includes three WLAN controllers, whose identifiers are AC1, AC2, and AC3 respectively. AC1 manages AP1, AP4, and AP5, AC2 manages AP3, and AC3 manages AP2. AP1, AP2, and AP3 are respectively edge APs in AC1, AC3, and AC2, and with respect to AP1, AC2, and AC3 are neighbor WLAN controllers.

A detailed description is provided using an example. For ease of description, STAs are distinguished as a first STA, a second STA, a third STA, and a fourth STA respectively. Correspondingly, APs are distinguished as a first AP, a second AP a third AP, and a fourth AP respectively. WLAN controllers are distinguished as a first WLAN controller and a second WLAN controller respectively. In the system the first STA associates with the first AP.

In this scenario, the first AP may be an internal AP or may be an edge AP. A WLAN controller stores an identifier of an edge AP managed by the WLAN controller. The identifier of the edge AP may be pre-configured in the WLAN controller, or may be dynamically acquired by the WLAN controller. The WLAN controller may dynamically acquire an identifier of an edge AP in the following manner. Each AP listens for a beacon frame sent by another AP, and obtains an identifier of the AP that sends the beacon frame obtained through listening. The WLAN controller acquires the identifier of the other AP that is obtained by each AP through listening, and marks, as an edge AP, an AP that obtains, through listening, identifiers that include an identifier of an AP that is not managed by the WLAN controller.

Figure 3:
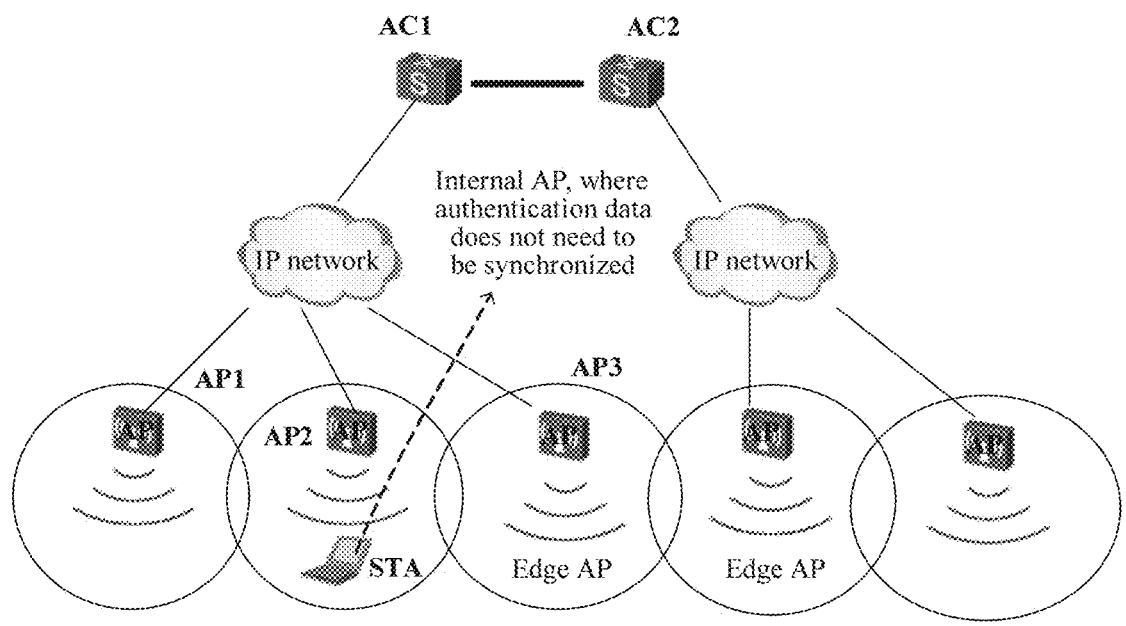
FIG. 3 is a schematic structural composition diagram of a system in which a STA associates with an internal AP according to Embodiment 1 of the present disclosure.

The first WLAN controller determines whether the first AP is an edge AP, and does not send authentication data of the STA if the first AP is an internal AP. As shown in FIG. 3, it is assumed that the first AP is AP2 managed by AC1. AP2 is an internal AP the STA associates with AP2, APs neighboring to AP2 are only AP1 and AP3, and both AP1 and AP3 are APs managed by AC1. Therefore, AC1 does not send the authentication data of the STA.

The first WLAN controller sends authentication data of the first STA to at least one WLAN controller if the first WLAN controller determines that the first AP is an edge AP. The at least one WLAN controller is another WLAN controller than the first WLAN controller. If there is a WLAN controller cluster, the at least one WLAN controller may be all other WLAN controllers in the WLAN controller cluster than the first WLAN controller, or may be some WLAN controllers in the WLAN controller cluster than the first WLAN controller.

The at least one WLAN controller includes the second WLAN controller, the second WLAN controller is a WLAN controller that manages the second AP, and the second AP is an AP neighboring to the first AP.

A specific implementation manner of sending, by the first WLAN controller, authentication data of the STA to at least one WLAN controller in a WLAN controller cluster may include the following manners.

First manner. The first WLAN controller sends the authentication data of the first STA to all WLAN controllers in the WLAN controller cluster.

The first WLAN controller may send the authentication data of the first STA to all the WLAN controllers in the WLAN controller cluster in a broadcast manner.

Alternatively, the first WLAN controller may send the authentication data of the first STA to each WLAN controller in all the WLAN controllers in the WLAN controller cluster in a unicast manner.

In the first manner for sending authentication data, optionally, the first WLAN controller may maintain an authentication data synchronization identifier of the first STA. Before sending the authentication data of the first STA, the first WLAN controller checks the authentication data synchronization identifier of the first STA. The first WLAN controller does not send the authentication data of the first STA if the authentication data synchronization identifier of the first STA is synchronized. The first WLAN controller sends the authentication data of the first STA only when the authentication data synchronization identifier of the first STA is unsynchronized.

Further, the authentication data synchronization identifier of the first STA may include multiple authentication data synchronization flags of the first STA. The multiple authentication data synchronization flags are mapped to multiple WLAN controllers. To record whether the authentication data of the STA is synchronized to the WLAN controllers, the multiple authentication data synchronization flags may be used to record states of the multiple WLAN controllers. Each WLAN controller corresponds to one authentication data synchronization flag, and each authentication data synchronization flag corresponds to one WLAN controller, that is, the multiple authentication data synchronization flags are in a one-to-one correspondence with the multiple WLAN controllers. The first WLAN controller checks an authentication data synchronization flag corresponding to the destination WLAN controller before sending the authentication data of the first STA to a destination WLAN controller. The first WLAN controller sends the authentication data of the first STA to the destination WLAN controller only when the authentication data synchronization flag corresponding to the destination WLAN controller is unsynchronized.

Second manner. The first WLAN controller sends the authentication data of the first STA to some WLAN controllers in the WLAN controller cluster. The some WLAN controllers include the second WLAN controller, the second WLAN controller is a WLAN controller that manages the second AP, and the second AP is an AP neighboring to the first AP.

In the second manner, the first WLAN controller selectively sends the authentication data of the first STA. The first WLAN controller maintains an authentication data synchronization identifier of the first STA, and the authentication data synchronization identifier of the first STA includes multiple authentication data synchronization flags of the first STA. The multiple authentication data synchronization flags are mapped to multiple WLAN controllers. The first WLAN controller may send the authentication data of the first STA to only a WLAN controller that manages a neighbor AP of the first AP and that corresponds to an authentication data synchronization flag that is unsynchronized. The first WLAN controller modifies the authentication data synchronization flag, which corresponds to the WLAN controller to which the authentication data of the first STA is sent, to synchronized. The first WLAN controller sends the modified authentication data synchronization identifier of the first STA to all WLAN controllers. Alternatively, the first WLAN controller sends the modified authentication data synchronization identifier of the first STA to the WLAN controller that manages the neighbor AP of the first AP.

The first WLAN controller that sends the authentication data in the second manner not only stores an edge AP managed by the first WLAN controller, but also stores a neighbor AP of each edge AP and a WLAN controller that manages the neighbor AP of each edge AP.

The first WLAN controller stores identifiers of neighbor APs of edge APs managed by the first WLAN controller, and then determines WLAN controllers that manage the neighboring APs of these edge APs. Optionally, the WLAN controller may ignore an identifier, in the identifiers of the neighbor APs of the edge APs, of an AP managed by the WLAN controller.

The first WLAN controller may store, in the following two manners, the identifiers of the neighbor APs of the edge APs managed by the WLAN controller.

A. The first WLAN controller pre-configures the identifiers of the neighbor APs of the edge APs managed by the WLAN controller.

The first WLAN controller may acquire, from APs managed by the first WLAN controller, the identifiers of the neighbor APs of the edge APs managed by the first WLAN controller.

In Manner B, each AP sends a beacon frame, and listens for a beacon frame sent by another AP. The AP obtains, according to the beacon frame obtained through listening, an identifier of the AP that sends the beacon frame. The AP sends an obtained identifier of a neighboring AP to the first WLAN controller that manages the AP. The identifier of the AP may be a basic service set identifier (BSSID) in the beacon frame obtained through listening.

The first WLAN controller may determine, in two manners, the WLAN controllers that manage the neighbor APs of these edge APs.

A. The first WLAN controller pre-configures the WLAN controllers that manage the neighbor APs of these edge APs.

B. The first WLAN controller communicates with other WLAN controllers, and determines the WLAN controllers that manage the neighbor APs.

When the authentication data of the first STA is sent to some WLAN controllers in all the WLAN controllers according to authentication data synchronization flags, the WLAN controller can determine which neighbor WLAN controllers have stored the authentication data of the STA, and may send the authentication data of the STA to only a WLAN controller that does not store the authentication data of the STA in order to reduce signaling exchange.

Figure 4:
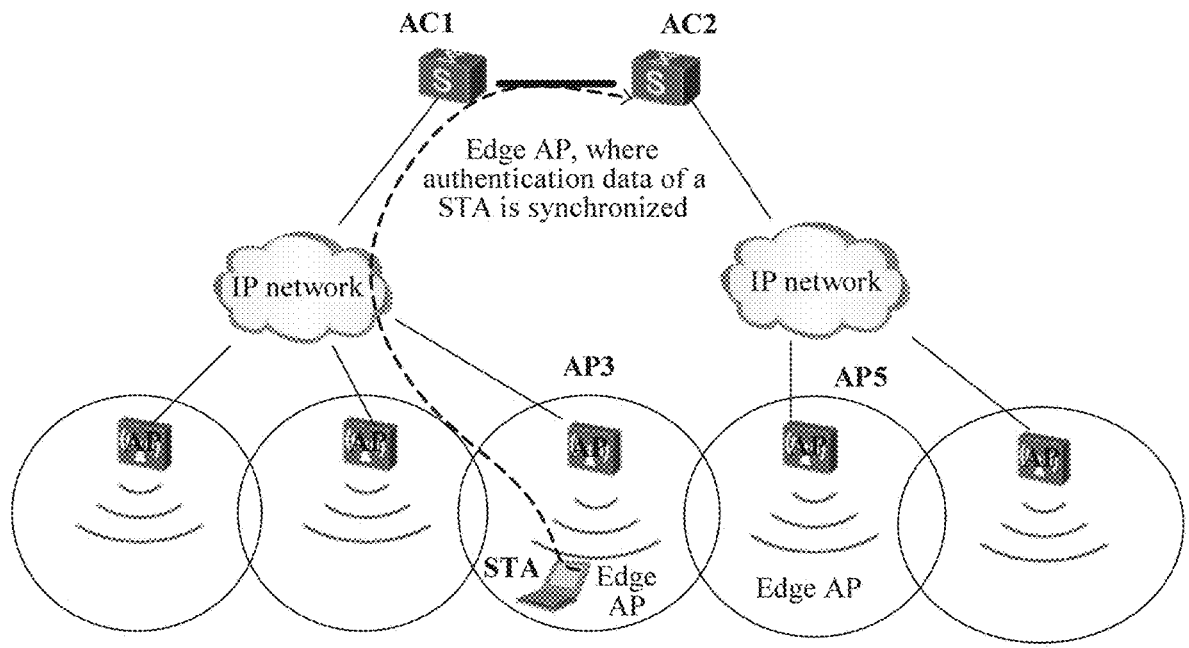
FIG. 4 is a schematic structural composition diagram of a system in which a STA associates with an edge AP according to Embodiment 1 of the present disclosure.

FIG. 4 is used as an example. It is assumed that the first AP is an edge AP, and that the first STA associates with an edge AP managed by AC1 (for example, AP3 shown in FIG. 4). AC2 is a neighbor WLAN controller of AC1, AC1 stores a correspondence between AP3 and AC2, and AC1 stores the authentication data synchronization identifier of the STA, where the authentication data synchronization identifier includes an authentication data synchronization flag of AC2. AC1 determines that the authentication data of the STA needs to be sent to AC2 when the STA associates with AP3. In this case, AC1 does not send the authentication data of the STA to AC2 if the authentication data synchronization identifier of the STA that is stored in AC1 indicates that AC2 has stored the authentication data of the STA, or AC1 sends the authentication data of the STA to AC2 if the authentication data synchronization identifier of the STA that is stored in AC1 indicates that AC2 has not stored the authentication data of the STA, and modifies the authentication data synchronization identifier of the STA to synchronized. Further, the authentication data synchronization flag corresponding to AC2 may be modified to synchronized.

In the foregoing system, after synchronizing the authentication data of the STA, the WLAN controller may not delete the authentication data of the STA, or may delete the authentication data of the STA in some cases. The solution of not deleting the authentication data of the STA can reduce signaling exchange between WLAN controllers, and better reduce signaling resources. In the solution of deleting the authentication data of the STA, the authentication data can be deleted in time when a WLAN controller does not need the authentication data of the STA, to save a storage resource of the WLAN controller. For ease of description, the solution of deleting the authentication data of the STA is described below in detail.

A roaming process of the STA includes at least three roaming scenarios roaming from an edge AP to another edge AP, roaming from an edge AP to an internal AP, and roaming from an internal AP to an edge AP. Some WLAN controllers in the system may have stored the authentication data of the STA, and do not need to continue storing the authentication data of the STA when the STA roams between different APs. In this case, the WLAN controllers may delete the stored authentication data of the STA.

For different sending manners for the WLAN controller to send the authentication data and different roaming scenarios of the STA, in the technical solution provided in Embodiment 1 of the present disclosure, detailed descriptions of different solutions of deleting the authentication data of the STA are given.

First manner. The authentication data of the first STA may not be deleted when the first STA roams, and if the first WLAN controller sends the authentication data of the first STA to all the WLAN controllers in the WLAN controller cluster.

In the first manner, the authentication data of the first STA stored in the WLAN controller may not be deleted if the first STA roams, in any scenario of the three roaming scenarios roaming from an edge AP to another edge AP, roaming from an edge AP to an internal AP, and roaming from an internal AP to an edge AP. In this manner, the WLAN controller maintains an authentication data synchronization identifier of each STA. The WLAN controller sends the authentication data of the first STA to all the WLAN controllers only when the authentication data of the STA is not synchronized according to the authentication data synchronization identifier.

Second manner. The authentication data of the first STA stored in another WLAN controller in the WLAN controller cluster may be deleted if the first WLAN controller sends the authentication data of the first STA to all the WLAN controllers in the WLAN controller cluster, in a roaming scenario in which the first STA roams from an edge AP to an internal AP. In this manner, the WLAN controller may not maintain an authentication data synchronization identifier of each STA.

That the second STA associates with the second AP is used as an example. The second STA disassociates from the first AP (that is, an edge AP), and after roaming, the second STA associates with the second AP, where the second AP is an internal AP. The first WLAN controller determines that the first WLAN controller has stored authentication data of the second STA when the second STA associates with the second AP, and the first WLAN controller sends an authentication data deletion message, where the authentication data deletion message includes an identifier of the second STA, and the authentication data deletion message instructs a receiver of the authentication data deletion message to delete the authentication data of the second STA. The first WLAN controller sends the authentication data deletion message to all the WLAN controllers. The first WLAN controller may broadcast the authentication data deletion message, or may separately send the authentication data deletion message to all the WLAN controllers in a unicast manner.

Third manner. The authentication data of the first STA stored in some WLAN controllers may be deleted selectively when the first STA roams, and if the first WLAN controller sends the authentication data of the first STA to all the WLAN controllers in the WLAN controller cluster. In this manner, the WLAN controller maintains an authentication data synchronization identifier of each STA and each authentication data synchronization identifier includes multiple authentication data synchronization flags. The first WLAN controller sends the authentication data of the STA to all the WLAN controllers when the STA associates with an edge AP for the first time. Afterward, the WLAN controller selectively sends the authentication data of the STA according to the authentication data synchronization flags of the STA.

In the third manner, in a scenario in which a STA roams from an edge AP to an edge AP, in the technical solution provided in Embodiment 1 of the present disclosure, for ease of description, a third STA is introduced, and the third STA disassociates from another edge AP and then associates with the first AP.

In a scenario in which another AP is an edge AP, and the first AP is an edge AP, the first WLAN controller determines a WLAN controller from which authentication data is to be deleted, where an authentication data synchronization flag that is of the third STA and that corresponds to the WLAN controller from which authentication data is to be deleted is synchronized, and no AP managed by the WLAN controller from which authentication data is to be deleted is neighboring to the first AP. The first WLAN controller sends an authentication data deletion message to the WLAN controller from which authentication data is to be deleted, where the authentication data deletion message includes an identifier of the third STA. The authentication data deletion message instructs a receiver of the authentication data deletion message to delete authentication data of the third STA. The first WLAN controller modifies the authentication data synchronization flag that is of the third STA, that corresponds to the WLAN controller from which authentication data is to be deleted, and that is in an authentication data synchronization identifier of the third STA to unsynchronized, and sends the authentication data synchronization identifier of the third STA to another WLAN controller.

In the third manner, in a scenario in which a STA roams from an edge AP to an internal AP, for ease of description, an example in which the fourth STA associates with the fourth AP is used for a detailed description. The fourth AP is an internal AP. The first WLAN controller sends an authentication data deletion message to a WLAN controller corresponding to an authentication data synchronization flag that is synchronized, in multiple authentication data synchronization flags of the fourth STA when the fourth STA associates with the fourth AP, where the authentication data deletion message includes an identifier of the fourth STA, the authentication data deletion message instructs a receiver of the authentication data deletion message to delete authentication data of the fourth STA, the fourth AP is an internal AP, and the internal AP is an AP whose neighboring APs are all managed by a same WLAN controller.

Fourth manner. The authentication data of the first STA stored in some WLAN controllers may be deleted selectively when the first STA roams, if the first MAN controller selectively sends the authentication data of the first STA to some WLAN controllers in the WLAN controller cluster. In this manner, the WLAN controller maintains an authentication data synchronization identifier of each STA, and each authentication data synchronization identifier includes multiple authentication data synchronization flags. The WLAN controller selectively sends the authentication data of the STA according to the authentication data synchronization flags of the STA when the STA associates with an edge AP.

In the fourth manner, in a scenario in which a STA roams from an internal AP to an edge AP, in the technical solution provided in Embodiment 1 of the present disclosure, for ease of description, a fifth STA is introduced and the fifth STA disassociates from another AP (internal AP) and then associates with the first AP (edge AP).

In a scenario in which another P is an internal AP, and the first AP is an edge AP, the first WLAN controller determines a WLAN controller from which authentication data is to be deleted, where an authentication data synchronization flag that is of the fifth STA and that corresponds to the WLAN controller from which authentication data is to be deleted is synchronized, and no AP managed by the WLAN controller from which authentication data is to be deleted is neighboring to the first AP. The first WLAN controller sends an authentication data deletion message to the WLAN controller from which authentication data is to be deleted, where the authentication data deletion message includes an identifier of the fifth STA. The authentication data deletion message instructs a receiver of the authentication data deletion message to delete authentication data of the fifth STA. The first WLAN controller modifies the authentication data synchronization flag that is of the fifth STA, that corresponds to the WLAN controller from which authentication data is to be deleted, and that is in an authentication data synchronization identifier of the fifth STA to unsynchronized, and sends the authentication data synchronization identifier of the fifth STA to another WLAN controller.

In the fourth manner, in a scenario in which a STA roams from an edge AP to an internal AP, for ease of description, an example in which a sixth STA associates with a sixth AP is used for a detailed description. The sixth AP is an internal AP. The first WLAN controller determines that the first WLAN controller has stored authentication data of the sixth STA when the sixth STA associates with the sixth AP, and the first WLAN controller sends an authentication data deletion message to a WLAN controller corresponding to an authentication data synchronization flag that is synchronized, in multiple authentication data synchronization flags of the sixth STA, where the authentication data deletion message includes an identifier of the sixth STA, the authentication data deletion message instructs a receiver of the authentication data deletion message to delete the authentication data of the sixth STA, the sixth AP is an internal AP, and the internal AP is an AP whose neighboring APs are all managed by a same WLAN controller.

Fifth manner. All WLAN controllers in the other WLAN controllers may be instructed to delete the stored authentication data of the first STA when the first STA roams, and if the first WLAN controller selectively sends the authentication data of the first STA to some WLAN controllers in the WLAN controller cluster. In this manner, the WLAN controller maintains an authentication data synchronization identifier of each STA. Each authentication data synchronization identifier includes multiple authentication data synchronization flags. The WLAN controller selectively sends the authentication data of the STA according to the authentication data synchronization flags of the STA when the STA associates with an edge AP.

In the fifth manner, in a scenario in which an STA roams from an edge AP to an internal AP for ease of description, an example in which a seventh STA associates with a seventh AP is used for a detailed description. The seventh AP is an internal AP. The seventh STA disassociates from the first AP (that is, an edge AP), and after roaming, associates with the seventh AP, where the seventh AP is an internal AP. The first WLAN controller sends an authentication data deletion message to a WLAN controller corresponding to an authentication data synchronization flag that is synchronized, in multiple authentication data synchronization flags of the seventh STA when the seventh STA associates with the seventh AP, where the authentication data deletion message includes an identifier of the seventh STA, the authentication data deletion message instructs a receiver of the authentication data deletion message to delete authentication data of the seventh STA, the seventh AP is an internal AP, and the internal AP is an AP whose neighboring APs are all managed by a same WLAN controller.

In the fifth manner, in a scenario in which another AP is an edge AP, and the first AP is an edge AP, an eighth STA is used as an example, and the first WLAN controller determines a WLAN controller from which authentication data is to be deleted, where an authentication data synchronization flag that is of the eighth STA and that corresponds to the WLAN controller from which authentication data is to be deleted is synchronized, and no AP managed by the WLAN controller from which authentication data is to be deleted is neighboring to the first AP. The first WLAN controller sends an authentication data deletion message to the WLAN controller from which authentication data is to be deleted, where the authentication data deletion message includes an identifier of the eighth STA. The authentication data deletion message instructs a receiver of the authentication data deletion message to delete authentication data of the eighth STA. The first WLAN controller modifies the authentication data synchronization flag that is of the eighth STA, that corresponds to the WLAN controller from which authentication data is to be deleted, and that is in an authentication data synchronization identifier of the eighth STA to unsynchronized, and sends the authentication data synchronization identifier of the eighth STA to another WLAN controller.

Sixth manner. The authentication data of the first STA stored in the WLAN controllers may not be deleted when the first STA roams, and if the first WLAN controller sends the authentication data of the first STA to some WLAN controllers in the WLAN controller cluster. In this manner, the WLAN controller maintains an authentication data synchronization identifier of each STA, and each authentication data synchronization identifier includes multiple authentication data synchronization flags. The first WLAN controller sends the authentication data of the STA to all the WLAN controllers when the STA associates with an edge AP for the first time. Afterward, the WLAN controller selectively sends the authentication data of the STA according to the authentication data synchronization flags of the STA.

In the sixth manner, the authentication data of the first STA stored in another WLAN controller is not deleted regardless of whether a roaming scenario of the first STA is any scenario of the three roaming scenarios roaming from an edge AP to another edge AP, roaming from an edge AP to an internal AP, and roaming from an internal AP to an edge AP.

Figure 5:
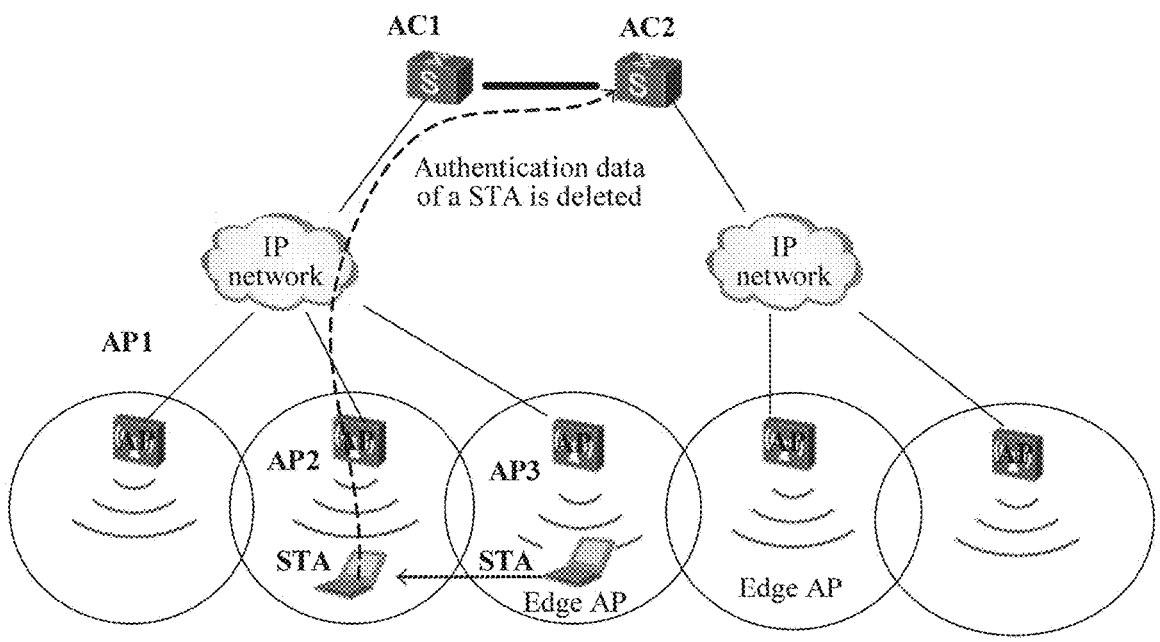
FIG. 5 is a schematic structural composition diagram of a system in which a STA roams from an edge AP to an internal AP according to Embodiment 1 of the present disclosure.

Synchronization and deletion of authentication data in different roaming scenarios of an STA are described below in detail using an example. FIG. 5 is used as an example. AP1, AP2, and AP3 are all APs managed by AC1, where both AP1 and AP2 are internal APs, and AP3 is an edge AP. An STA accesses AP3 by associating with AP3, and because AP3 is an edge AP, AC1 synchronizes authentication data of the STA into AC2. After disassociating from AP3, the STA accesses AP2 by associating with AP2, where AP2 is an internal AP. In this scenario, the STA roams from the edge AP to the internal AP, and AC1 may selectively send an authentication data deletion message to AC2. AC2 deletes the stored authentication data of the STA when receiving the authentication data deletion message.

Further, AC1 stores an authentication data synchronization identifier of the STA, where the authentication data synchronization identifier includes an authentication data synchronization flag. After disassociating from AP3, the STA accesses AP2 by associating with AP2, where AP2 is an internal AP. In this scenario, AC1 determines, according to the stored authentication data synchronization flag, that AC2 has stored the authentication data of the STA, and AC1 sends an authentication data deletion message to AC2, and AC2 deletes the stored authentication data of the STA when receiving the authentication data deletion message.

Embodiment 2

Figure 6:
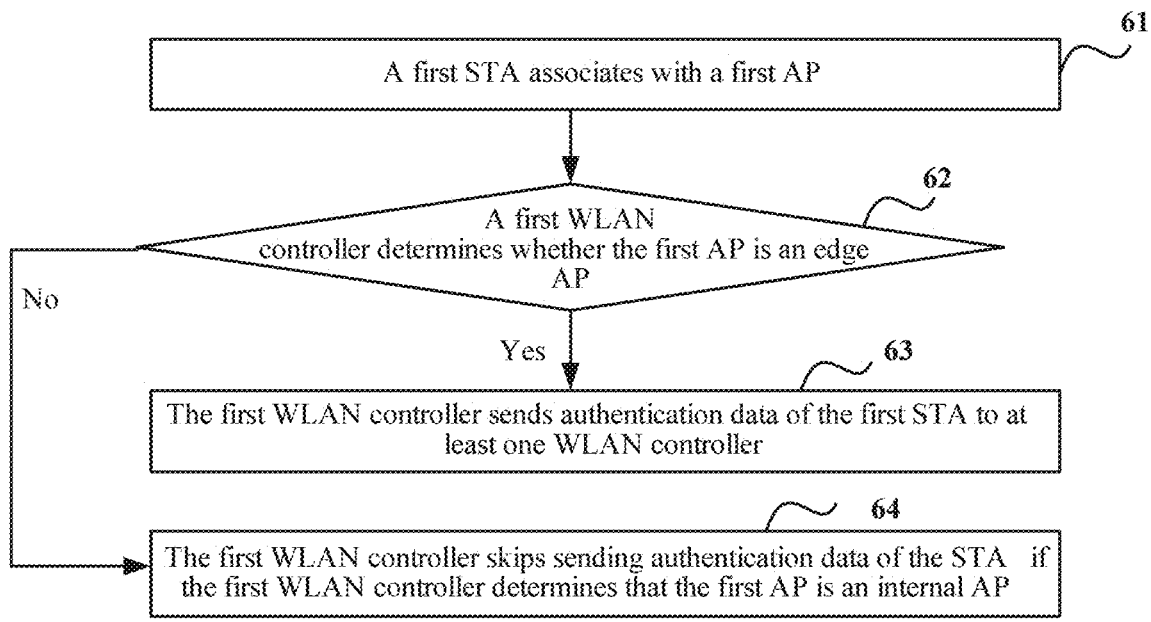
FIG. 6 is a flowchart of a method for managing authentication data of a STA according to Embodiment 2 of the present disclosure.

Embodiment 2 of the present disclosure provides a method for managing authentication data of a STA. As shown in FIG. 6, a specific processing procedure of the method is as follows.

Step 61. A first STA associates with a first AP.

In this scenario, the first AP may be an internal AP, or may be an edge AP.

Step 62. A first WLAN controller determines whether the first AP is an edge AP, perform step 63 if a determining result is yes, and otherwise, perform step 64.

In a technical solution provided in Embodiment 2 of the present disclosure, APs are classified into an internal AP and an edge AP. The edge AP is an AP neighboring to another AP, and the other AP and the edge AP are respectively managed by different WLAN controllers. That is, the edge AP is a type of AP with the following features. In all neighboring APs of the edge AP, at least one AP is managed by a WLAN controller that is different from a WLAN controller that manages the edge AP. The internal AP is an AP whose neighboring APs are all managed by a same WLAN controller. That is, the internal AP is a type of AP with the following features. The internal AP and all neighboring APs of the internal AP are managed by a same WLAN controller. A pair of neighbor APs refers to two APs that may become APs associated with a STA before and after roaming of the STA, and either AP of the pair of neighbor APs is a neighboring AP of the other AP. For ease of description, WLAN controllers that respectively manage two neighboring edge APs are referred to as neighbor WLAN controllers.

Step 63. The first WLAN controller sends authentication data of the first STA to at least one WLAN controller.

The at least one WLAN controller includes a second WLAN controller, the second WLAN controller is a WLAN controller that manages a second AP, and the second AP is an AP neighboring to the first AP.

A specific implementation manner of sending, by the first WLAN controller, authentication data of the STA to at least one WLAN controller in a WLAN controller cluster may include the following manners.

First manner. The first WLAN controller sends the authentication data of the first STA to all WLAN controllers in the WLAN controller cluster.

The first WLAN controller may send the authentication data of the first STA to all the WLAN controllers in the WLAN controller cluster in a broadcast manner.

Alternatively, the first WLAN controller may send the authentication data of the first STA to each WLAN controller in all the WLAN controllers in the WLAN controller cluster in a unicast manner.

In the first manner for sending authentication data, optionally, the first WLAN controller may maintain an authentication data synchronization identifier of the first STA. The first WLAN controller checks the authentication data synchronization identifier of the first STA before sending the authentication data of the first STA. The first WLAN controller does not send the authentication data of the first STA if the authentication data synchronization identifier of the first STA is synchronized. The first WLAN controller sends the authentication data of the first STA only when the authentication data synchronization identifier of the first STA is unsynchronized.

Further, the authentication data synchronization identifier of the first STA may include multiple authentication data synchronization flags of the first STA. The multiple authentication data synchronization flags are mapped to multiple WLAN controllers. To record whether the authentication data of the STA is synchronized to the WLAN controllers, the multiple authentication data synchronization flags may be used to record states of the multiple WLAN controllers. Each WLAN controller corresponds to one authentication data synchronization flag, and each authentication data synchronization flag corresponds to one WLAN controller, that is, the multiple authentication data synchronization flags are in a one-to-one correspondence with the multiple WLAN controllers. The first WLAN controller checks an authentication data synchronization flag corresponding to a destination WLAN controller before sending the authentication data of the first STA to the destination WLAN controller. The first WLAN controller sends the authentication data of the first STA to the destination WLAN controller only when the authentication data synchronization flag corresponding to the destination WLAN controller is unsynchronized.

Second manner. The first WLAN controller sends the authentication data of the first STA to some WLAN controllers in the WLAN controller cluster. The some WLAN controllers include a second WLAN controller, the second WLAN controller is a WLAN controller that manages a second AP, and the second AP is an AP neighboring to the first AP.

In the second manner, the first WLAN controller selectively sends the authentication data of the first STA. The first WLAN controller maintains an authentication data synchronization identifier of the first STA, and the authentication data synchronization identifier of the first STA includes multiple authentication data synchronization flags of the first STA. The multiple authentication data synchronization flags are mapped to multiple WLAN controllers. The first WLAN controller may send the authentication data of the first STA to only a WLAN controller that manages a neighbor AP of the first AP and that corresponds to an authentication data synchronization flag that is unsynchronized. The first WLAN controller modifies the authentication data synchronization flag, which corresponds to the WLAN controller to which the authentication data of the first STA is sent, to synchronized. The first WLAN controller sends the modified authentication data synchronization identifier of the first STA to all WLAN controllers. Alternatively, the first WLAN controller sends the modified authentication data synchronization identifier of the first STA to the WLAN controller that manages the neighbor AP of the first AP.

The first WLAN controller that sends the authentication data in the second manner not only stores an edge AP managed by the first WLAN controller, but also stores a neighbor AP of each edge AP and a WLAN controller that manages the neighbor AP of each edge AP.

The first WLAN controller stores identifiers of neighbor APs of edge APs managed by the first WLAN controller, and then determines WLAN controllers that manage the neighboring APs of these edge APs. Optionally, the WLAN controller may ignore an identifier, in the identifiers of the neighbor APs of the edge APs, of an AP managed by the WLAN controller.

The first WLAN controller may store, in the following two manners, the identifiers of the neighbor APs of the edge APs managed by the WLAN controller.

A. The first WLAN controller pre-configures the identifiers of the neighbor APs of the edge APs managed by the WLAN controller.

B. The first WLAN controller may acquire, from APs managed by the first WLAN controller, the identifiers of the neighbor APs of the edge APs managed by the first WLAN controller.

In Manner B, each AP sends a beacon frame, and listens for a beacon frame sent by another AP. The AP obtains, according to the beacon frame obtained through listening, an identifier of the AP that sends the beacon frame. The AP sends an obtained identifier of a neighboring AP to the first WLAN controller that manages the AP. The identifier of the AP may be a BSSID in the beacon frame obtained through listening.

The first WLAN controller may determine, in two manners, the WLAN controllers that manage the neighbor APs of these edge APs.

A. The first WLAN controller pre-configures the WLAN controllers that manage the neighbor APs of these edge APs.

B. The first WLAN controller communicates with other WLAN controllers, and determines the WLAN controllers that manage the neighbor APs.

The WLAN controller can determine which neighbor WLAN controllers have stored the authentication data of the STA when the authentication data of the first STA is sent to some WLAN controllers in all the WLAN controllers according to authentication data synchronization flags, and may send the authentication data of the STA to only a WLAN controller that does not store the authentication data of the STA in order to reduce signaling exchange.

Step 64. The first WLAN controller does not send authentication data of the STA if the first WLAN controller determines that the first AP is an internal AP.

Optionally, in the foregoing method, after synchronizing the authentication data of the STA, the first WLAN controller may not delete the authentication data of the STA, or may delete the authentication data of the STA in some cases. The solution of deleting the authentication data of the STA is described below in detail.

A roaming process of the STA includes at least three roaming scenarios roaming from an edge AP to another edge AP, roaming from an edge AP to an internal AP, and roaming from an internal AP to an edge AP. Some WLAN controllers in a system may have stored the authentication data of the STA, and do not need to continue storing the authentication data of the STA when the STA roams between different APs. In this case, the WLAN controllers may delete the stored authentication data of the STA.

For different sending manners for the WLAN controller to send the authentication data and different roaming scenarios of the STA, in the technical solution provided in Embodiment 2 of the present disclosure, detailed descriptions of different solutions of deleting the authentication data of the STA are given.

First manner. The authentication data of the first STA may not be deleted when the first STA roams, and if the first WLAN controller sends the authentication data of the first STA to all the WLAN controllers in the WLAN controller cluster.

In the first manner, the authentication data of the first STA stored in the WLAN controller may not be deleted if the first STA roams, in any scenario of the three roaming scenarios roaming from an edge AP to another edge AP, roaming from an edge AP to an internal AP, and roaming from an internal AP to an edge AP. In this manner, the WLAN controller maintains an authentication data synchronization identifier of each STA. The WLAN controller sends the authentication data of the first STA to all the WLAN controllers only when the authentication data of the STA is not synchronized according to the authentication data synchronization identifier.

Second manner. The authentication data of the first STA stored in another MAN controller in the WLAN controller cluster may be deleted if the first WLAN controller sends the authentication data of the first STA to all the WLAN controllers in the WLAN controller cluster, in a roaming scenario in which the first STA roams from an edge AP to an internal AP. In this manner, the WLAN controller may not maintain an authentication data synchronization identifier of each STA.

Further, for the second specific implementation manner for deleting the authentication data of the STA, refer to the detailed description in the foregoing Embodiment 1. Details are not described again in Embodiment 2 of the present disclosure.

Third manner. The authentication data of the first STA stored in some WLAN controllers may be deleted selectively when the first STA roams, and if the first WLAN controller sends the authentication data of the first STA to all the WLAN controllers in the WLAN controller cluster. In this manner, the WLAN controller maintains an authentication data synchronization identifier of each STA, and each authentication data synchronization identifier includes multiple authentication data synchronization flags. The first WLAN controller sends the authentication data of the STA to all the WLAN controllers when the STA associates with an edge AP for the first time. Afterward, the WLAN controller selectively sends the authentication data of the STA according to the authentication data synchronization flags of the STA.

Further, for the third specific implementation manner for deleting the authentication data of the STA, refer to the detailed description in the foregoing Embodiment 1. Details are not described again in Embodiment 2 of the present disclosure.

Fourth manner. The authentication data of the first STA stored in some WLAN controllers may be deleted selectively when the first STA roams, and if the first WLAN controller selectively sends the authentication data of the first STA to some WLAN controllers in the WLAN controller cluster. In this manner, the WLAN controller maintains an authentication data synchronization identifier of each STA, and each authentication data synchronization identifier includes multiple authentication data synchronization flags. The WLAN controller selectively sends the authentication data of the STA according to the authentication data synchronization flags of the STA when the STA associates with an edge AP.

Further, for the fourth specific implementation manner for deleting the authentication data of the STA, refer to the detailed description in the foregoing Embodiment 1. Details are not described again in Embodiment 2 of the present disclosure.

Fifth manner. All WLAN controllers in the other WLAN controllers may be instructed to delete the stored authentication data of the first STA when the first STA roams, and if the first WLAN controller selectively sends the authentication data of the first STA to some WLAN controllers in the WLAN controller cluster. In this manner, the WLAN controller maintains an authentication data synchronization identifier of each STA. Each authentication data synchronization identifier includes multiple authentication data synchronization flags. The WLAN controller selectively sends the authentication data of the STA according to the authentication data synchronization flags of the STA when the STA associates with an edge AP.

Further, for the fifth specific implementation manner for deleting the authentication data of the STA, refer to the detailed description in the foregoing Embodiment 1. Details are not described again in Embodiment 2 of the present disclosure.

Sixth manner. The authentication data of the first STA stored in the WLAN controllers may not be deleted when the first STA roams, and if the first WLAN controller sends the authentication data of the first STA to some WLAN controllers in the WLAN controller cluster. In this manner, the WLAN controller maintains an authentication data synchronization identifier of each STA, and each authentication data synchronization identifier includes multiple authentication data synchronization flags. The first WLAN controller sends the authentication data of the STA to all the WLAN controllers when the STA associates with an edge AP for the first time. Afterward, the WLAN controller selectively sends the authentication data of the STA according to the authentication data synchronization flags of the STA.

In the sixth manner, the authentication data of the first STA stored in another WLAN controller is not deleted regardless of whether a roaming scenario of the first STA is any scenario of the three roaming scenarios roaming from an edge AP to another edge AP, roaming from an edge AP to an internal AP, and roaming from an internal AP to an edge AP.

Figure 7:
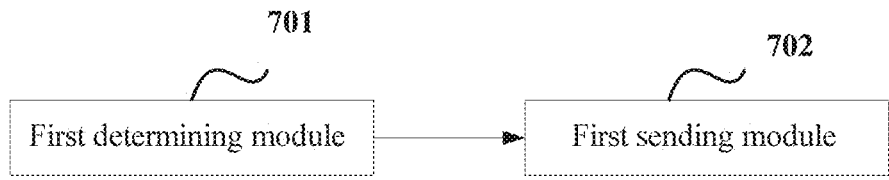
FIG. 7 is a schematic structural composition diagram of an apparatus for managing authentication data of a STA according to Embodiment 2 of the present disclosure.

Correspondingly, Embodiment 2 of the present disclosure further provides an apparatus for managing authentication data of a STA. As shown in FIG. 7, the management apparatus is implemented by a first WLAN controller and includes a first determining module 701 configured to determine that a first AP is an edge AP when a first STA associates with the first AP, where the edge AP is an AP neighboring to another AP, and the other AP and the edge AP are respectively managed by different WLAN controllers, and a first sending module 702 configured to send authentication data of the first STA to at least one WLAN controller.

Further, the at least one WLAN controller includes a second WLAN controller, the second WLAN controller is a WLAN controller that manages a second AP, and the second AP is an AP neighboring to the first AP.

Further, the first sending module 702 is further configured to send the authentication data of the first STA to the at least one WLAN controller, modify an authentication data synchronization identifier of the first STA to synchronized when the authentication data synchronization identifier of the first STA is unsynchronized, and send the modified authentication data synchronization identifier of the first STA to the at least one WLAN controller.

The authentication data synchronization identifier of the first STA includes multiple authentication data synchronization flags, and the multiple authentication data synchronization flags are mapped to multiple WLAN controllers, and the first sending module 702 is further configured to send the authentication data of the first STA to the at least one WLAN controller, modify an authentication data synchronization flag corresponding to the at least one WLAN controller to synchronized when the authentication data synchronization flag corresponding to the at least one WLAN controller is unsynchronized, and send the modified authentication data synchronization identifier of the first STA to the at least one WLAN controller.

Optionally, the apparatus further includes an execution module (not shown) and a second sending module (not shown), where the second sending module is configured to determine a WLAN controller from which authentication data is to be deleted, and send an authentication data deletion message to the WLAN controller from which authentication data is to be deleted when a second STA associates with the first AP, where the authentication data deletion message includes an identifier of the second STA, the authentication data deletion message instructs a receiver of the authentication data deletion message to delete authentication data of the second STA, an authentication data synchronization flag that is of the second STA and that corresponds to the WLAN controller from which authentication data is to be deleted is synchronized, and no AP in at least one AP managed by the WLAN controller from which authentication data is to be deleted is neighboring to the first AP and the execution module is configured to modify the authentication data synchronization flag that is of the second STA, that corresponds to the WLAN controller from which authentication data is to be deleted, and that is in an authentication data synchronization identifier of the second STA to unsynchronized, and send the authentication data synchronization identifier of the second STA.

Optionally, the apparatus further includes a second determining module and a third sending module, where the second determining module is configured to determine that the first WLAN controller has stored authentication data of the third STA when a third STA associates with a third AP, where the third AP is an internal AP, and the internal AP is an AP whose neighbor APs are all managed by a same WLAN controller, and the third sending module is configured to send an authentication data deletion message, where the authentication data deletion message includes an identifier of the third STA, and the authentication data deletion message instructs a receiver of the authentication data deletion message to delete the authentication data of the third STA.

The apparatus further includes a fourth sending module, where the fourth sending module is configured to send an authentication data deletion message to a WLAN controller corresponding to an authentication data synchronization flag that is synchronized, in multiple authentication data synchronization flags of a fourth STA when the fourth STA associates with a fourth AP, where the authentication data deletion message includes an identifier of the fourth STA, the authentication data deletion message instructs a receiver of the authentication data deletion message to delete authentication data of the fourth STA, the fourth AP is an internal AP, and the internal AP is an AP whose neighboring APs are all managed by a same WLAN controller.

Figure 8:
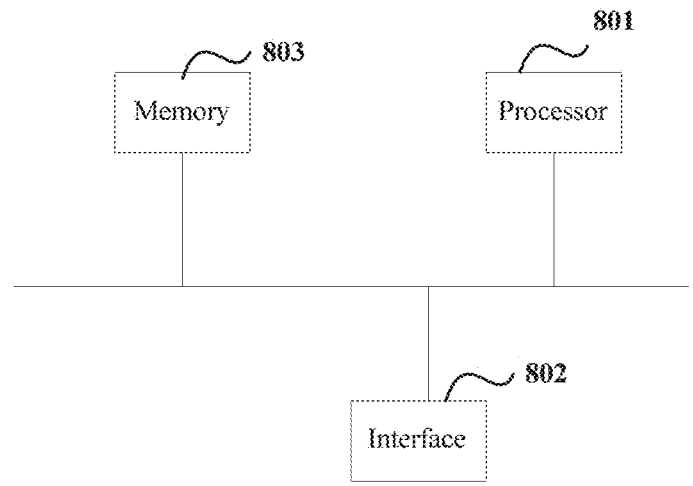
FIG. 8 is a schematic structural composition diagram of a device for managing authentication data of a STA according to Embodiment 2 of the present disclosure.

Correspondingly, Embodiment 2 of the present disclosure further provides a WLAN controller. As shown in FIG. 8, the WLAN controller includes a processor 801, an interface 802, and a memory 803.

The processor 801 is configured to determine that a first AP is an edge AP when a first STA associates with the first AP, and send authentication data of the first STA to at least one WLAN controller through the interface 802, where the edge AP is an AP neighboring to another AP, and the other AP and the edge AP are respectively managed by different WLAN controllers.

The processor may be a central processing unit (CPU) or a combination of a CPU and a hardware chip. Alternatively, the processor 801 may be a network processor (NP), or a combination of a CPU and an NP, or a combination of an NP and a hardware chip.

The hardware chip may be one or any combination of an application-specific integrated circuit (ASIC), a field-programmable gate array (FPGA), and a complex programmable logic device (CPLD).

Further, the processor 801 sends the authentication data of the STA to the at least one WLAN controller through the interface 802, where the at least one WLAN controller includes a second WLAN controller, the second WLAN controller is a WLAN controller that manages a second AP, and the second AP is an AP neighboring to the first AP.

The processor 801 is further configured to send the authentication data of the first STA to the at least one WLAN controller through the interface 802, and modify an authentication data synchronization identifier of the first STA to synchronized when the authentication data synchronization identifier of the first STA is unsynchronized, and send the modified authentication data synchronization identifier of the first STA to the at least one WLAN controller through the interface 802.

The authentication data synchronization identifier of the first STA includes multiple authentication data synchronization flags, and the multiple authentication data synchronization flags are mapped to multiple WLAN controllers, and the processor 801 is further configured to modify an authentication data synchronization flag corresponding to the at least one WLAN controller to synchronized when the authentication data synchronization flag corresponding to the at least one WLAN controller is unsynchronized.

The processor 801 is further configured to determine a WLAN controller from which authentication data is to be deleted when a second STA associates with the first AP, where an authentication data synchronization flag that is of the second STA and that corresponds to the WLAN controller from which authentication data is to be deleted is synchronized, and no AP in at least one AP managed by the WLAN controller from which authentication data is to be deleted is neighboring to the first AP, send, through the interface, an authentication data deletion message to the WLAN controller from which authentication data is to be deleted, where the authentication data deletion message includes an identifier of the second STA, the authentication data deletion message instructs a receiver of the authentication data deletion message to delete authentication data of the second STA, and modify the authentication data synchronization flag that is of the second STA, that corresponds to the WLAN controller from which authentication data is to be deleted, and that is in an authentication data synchronization identifier of the second STA to unsynchronized, and send the authentication data synchronization identifier of the second STA.

The processor 801 is further configured to determine that the first WLAN controller has stored authentication data of a third STA when the third STA associates with a third AP, where the third AP is an internal AP, and the internal AP is an AP whose neighbor APs are all managed by a same WLAN controller, and send an authentication data deletion message through the interface, where the authentication data deletion message includes an identifier of the third STA, and the authentication data deletion message instructs a receiver of the authentication data deletion message to delete the authentication data of the third STA.

The processor 801 is further configured to send, through the interface 802, an authentication data deletion message to a WLAN controller corresponding to an authentication data synchronization flag that is synchronized, in multiple authentication data synchronization flags of a fourth STA when the fourth STA associates with a fourth AP, where the authentication data deletion message includes an identifier of the fourth STA, the authentication data deletion message instructs a receiver of the authentication data deletion message to delete authentication data of the fourth STA, the fourth AP is an internal AP, and the internal AP is an AP whose neighboring APs are all managed by a same WLAN controller.

The interface may be one or more of a network interface controller (NIC) providing a wired interface, such as an Ethernet NIC, where the Ethernet NIC may provide a copper wire and/or fiber interface.

The memory 803 is configured to store the authentication data of the first STA.

The memory may be a volatile memory, such as a random-access memory (RAM), or a non-volatile memory, such as a flash memory, a hard disk drive (HDD), or a solid state drive (SSD), or a combination of the foregoing types of memories.

A person skilled in the art should understand that the embodiments of the present disclosure may be provided as a method, an apparatus (device), or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a magnetic storage, an optical memory, and the like) that include computer-usable program code.

The present disclosure is described with reference to the flowcharts and/or block diagrams of the method, the apparatus (device), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of an other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Although some preferred embodiments of the present disclosure have been described, the person skilled in the art can make changes and modifications to these embodiments once they learn the basic concept. Therefore, the following claims are intended to be construed as to cover the exemplary embodiments and all changes and modifications falling within the scope of the present disclosure.

Obviously, the person skilled in the art can make various modifications and variations to the present disclosure without departing from the scope of the present disclosure. The present disclosure is intended to cover these modifications and variations provided that they fall within the scope of protection defined by the following claims.

What is claimed is:

1. A method for managing authentication data of a station (STA), implemented by a first wireless local area network (WLAN) controller, the method comprising:
   sending STA authentication data to a second WLAN controller only when the STA establishes WLAN association with a first edge access point (AP), wherein the first edge AP, at least a second edge AP, and an internal AP are managed by the first WLAN controller, wherein neighboring APs of the internal AP are all managed by the first WLAN controller, wherein the first edge AP is a neighbor to an AP managed by the second WLAN controller, and wherein the STA authentication data is sent to the second WLAN controller before the STA is within a coverage area of the AP managed by the second WLAN controller.

2. The method of claim 1, wherein the STA has not established WLAN association with the second WLAN controller or with any AP managed by the second WLAN controller when the STA authentication data is sent to the second WLAN controller.

3. The method of claim 1, wherein the authentication data is configured to be used by the second WLAN controller to authenticate the STA.

4. The method of claim 1, wherein the first WLAN controller, the second WLAN controller, and a third WLAN controller are part of a WLAN controller cluster, wherein sending the STA authentication data to the second WLAN controller comprises sending the STA authentication data to the second WLAN controller and the third WLAN controller when the STA establishes the WLAN association with the first edge AP and not when the STA establishes a WLAN association with the internal AP.

5. The method of claim 1, wherein sending the STA authentication data to the second WLAN controller only when the STA establishes the WLAN association with the first edge AP comprises:
   sending, by the first WLAN controller, the STA authentication data to the second WLAN controller;
   modifying a STA authentication data synchronization identifier to synchronized when the STA authentication data synchronization identifier is unsynchronized; and
   sending the STA authentication data synchronization identifier that has been modified to the second WLAN controller.

6. The method of claim 5, wherein the STA authentication data synchronization identifier comprises a plurality of authentication data synchronization flags, wherein the authentication data synchronization flags are mapped to a plurality of WLAN controllers, wherein the STA authentication data synchronization identifier comprises a second WLAN controller authentication data synchronization flag that is unsynchronized, and wherein modifying the STA authentication data synchronization identifier to synchronized comprises modifying the second WLAN controller authentication data synchronization flag to synchronized.

7. The method of claim 6, wherein a second STA establishes WLAN association with the first edge AP, and wherein the method further comprises:
   determining that second STA authentication data is to be deleted from the second WLAN controller, wherein a second STA authentication data synchronization flag corresponds to the second WLAN controller;
   determining that the second WLAN controller does not have a neighboring edge AP to the first edge AP;
   sending an authentication data deletion message to the second WLAN controller, wherein the authentication data deletion message comprises a second STA identifier, and wherein the authentication data deletion message instructs the second WLAN controller to delete the second STA authentication data; and
   modifying the second STA authentication data synchronization flag corresponding to the second WLAN controller to be unsynchronized.

8. The method of claim 1, wherein a second STA establishes WLAN association with a second internal AP managed by the first WLAN controller, wherein the method further comprises sending an authentication data deletion message when the first WLAN controller has second STA authentication data stored, wherein the authentication data deletion message comprises a second STA identifier, and wherein the authentication data deletion message instructs the second WLAN controller to delete the authentication data.

9. The method of claim 8, wherein the second STA establishes the WLAN association with the second internal AP managed by the first WLAN controller, wherein a second STA authentication data synchronization identifier comprises a second STA authentication data synchronization flag for the second WLAN controller and a second STA authentication data synchronization flag for a third WLAN controller, wherein the second STA authentication data synchronization flag for the second WLAN controller is set to synchronized, wherein the second STA authentication data synchronization flag for the third WLAN controller is set to unsynchronized, and wherein the method further comprises:
   sending the authentication data deletion message to the second WLAN controller based on the second STA authentication data synchronization flag for the second WLAN controller being synchronized, wherein the authentication data deletion message comprises the second STA identifier, and wherein the authentication data deletion message instructs the second WLAN controller to delete the second STA authentication data; and
   not sending the authentication data deletion message to the third WLAN controller based on the second STA authentication data synchronization flag for the third WLAN controller being unsynchronized.

10. The method of claim 9, wherein a third STA establishes WLAN association with the second internal AP managed by the first WLAN controller, wherein a third STA authentication data synchronization identifier comprises a third STA authentication data synchronization flag for the second WLAN controller and a third STA authentication data synchronization flag for the third WLAN controller, wherein the third STA authentication data synchronization flag for the second WLAN controller is set to synchronized, wherein the third STA authentication data synchronization flag for the third WLAN controller is set to unsynchronized, and wherein the method further comprises:

sending the authentication data deletion message to the second WLAN controller based on the third STA authentication data synchronization flag for the second WLAN controller being synchronized, wherein the authentication data deletion message comprises a third STA identifier, and wherein the authentication data deletion message instructs the second WLAN controller to delete third STA authentication data; and not sending the authentication data deletion message to the third WLAN controller based on the third STA authentication data synchronization flag for the third WLAN controller being unsynchronized.

11. A first wireless local area network (WLAN) controller configured to manage a first edge access point (AP), at least a second edge AP, an internal AP, and neighboring APs to the internal AP, wherein the first edge AP is a neighbor to an AP managed by a second WLAN controller, and wherein the WLAN controller comprises:

a processor;

an interface coupled to the processor; and a memory coupled to the processor and the interface, wherein the memory stores instructions and station (STA) authentication data that, wherein when executed by the processor, the instructions cause the first WLAN controller to be configured to send the STA authentication data to the second WLAN controller through the interface only when the STA establishes WLAN association with the first edge AP managed by the first WLAN controller, and wherein the STA authentication data is sent to the second WLAN controller before the STA is within a coverage area of the AP managed by the second WLAN controller.

12. The first WLAN controller of claim 11, wherein the STA has not established WLAN association with the second WLAN controller or with the AP managed by the second WLAN controller when the STA authentication data is sent to the second WLAN controller.

13. The first WLAN controller of claim 11, wherein the first WLAN controller, the second WLAN controller, and a third WLAN controller are part of a WLAN controller cluster, wherein the processor is configured to send the STA authentication data to the second WLAN controller only when the STA establishes the WLAN association with the first edge AP comprises the instructions further causing the processor to be configured to send the STA authentication data to the second WLAN controller and the third WLAN controllers in the WLAN controller cluster when the STA establishes the WLAN association with the first edge AP and not when the STA establishes a WLAN association with the internal AP.

14. The first WLAN controller of claim 11, wherein the authentication data is configured to be used to authenticate the STA with the second WLAN controller.

15. The first WLAN controller of claim 11, wherein the processor is configured to send the STA authentication data to the second WLAN controller only when the STA establishes the WLAN association with the first edge AP comprises the instructions further causing the processor to be configured to:

send the STA authentication data to the second WLAN controller;

modify a STA authentication data synchronization identifier to synchronized when the STA authentication data synchronization identifier is unsynchronized; and send the STA authentication data synchronization identifier that has been modified to the second WLAN controller.

16. The first WLAN controller of claim 15, wherein the STA authentication data synchronization identifier comprises a plurality of authentication data synchronization flags, wherein the authentication data synchronization flags are mapped to a plurality of WLAN controllers, wherein the STA authentication data synchronization identifier is unsynchronized and comprises a second WLAN controller authentication data synchronization flag that is unsynchronized, and wherein the instructions causing the processor to be configured to modify the STA authentication data synchronization identifier to synchronized comprises the instructions further causing the processor to be configured to modify the second WLAN controller authentication data synchronization flag to synchronized.

17. The first WLAN controller of claim 16, wherein a second STA associates with the first edge AP, and wherein the instructions further cause the processor to be configured to:

determine that a second STA authentication data is to be deleted from the second WLAN controller, wherein a second STA authentication data synchronization flag corresponding to the second WLAN controller is synchronized;

determine that the second WLAN controller does not have any neighboring edge APs to the first edge AP;

send an authentication data deletion message to the second WLAN controller, wherein the authentication data deletion message comprises a second STA identifier, and wherein the authentication data deletion message instructs the second WLAN controller to delete the second STA authentication data; and modify the second STA authentication data synchronization flag corresponding to the second WLAN controller to unsynchronized.

18. A computer program product comprising computer-executable instructions for storage on a non-transitory computer-readable medium, that, when executed by a processor, cause an apparatus to:

send station (STA) authentication data to a second WLAN controller only when a STA establishes WLAN association with a first edge access point (AP);

manage the first edge AP, at least a second edge AP, and an internal AP; and manage all neighboring APs of the internal AP, wherein the first edge AP is a neighbor to an AP managed by the second WLAN controller, and wherein the STA authentication data is sent to the second WLAN controller before the STA is within a coverage area of the AP managed by the second WLAN controller.

19. The computer program product of claim 18, wherein the STA has not established WLAN association with the second WLAN controller or with any AP managed by the second WLAN controller when the STA authentication data is sent to the second WLAN controller.

20. The computer program product of claim 18, wherein the authentication data is configured to be used by the second WLAN controller to authenticate the STA.

* * * * *